United States Patent [19]

Sasaki et al.

[11] Patent Number: 5,093,904
[45] Date of Patent: Mar. 3, 1992

[54] PRINTING DEVICE HAVING TIME COUNTING MEANS TO CONTROL PRINTING FROM PAGE BUFFER

[75] Inventors: Ichiro Sasaki, Nagoya; Hidenori Hisada, Tokoname, both of Japan

[73] Assignee: Brother Kogyo Kabushiki Kaisha, Nagoya, Japan

[21] Appl. No.: 317,619

[22] Filed: Mar. 1, 1989

[30] Foreign Application Priority Data

Mar. 3, 1988 [JP] Japan .................. 63-28566[U]

[51] Int. Cl.⁵ .................................................. G06F 3/12
[52] U.S. Cl. ............................... 395/116; 395/115; 395/250; 364/DIG. 2; 364/930; 400/62; 400/76
[58] Field of Search ........ 364/519, 518, 900 MS File; 400/61, 62, 65, 70, 76

[56] References Cited

U.S. PATENT DOCUMENTS

| | | | |
|---|---|---|---|
| 3,958,224 | 5/1976 | Boyd et al. | 364/900 |
| 4,564,301 | 1/1986 | Ueno | 400/63 |
| 4,671,683 | 6/1987 | Ueno et al. | 400/61 |
| 4,713,780 | 12/1987 | Schultz et al. | 364/514 |
| 4,754,428 | 6/1988 | Schultz et al. | 364/900 |
| 4,843,571 | 6/1989 | Notermans et al. | 364/519 |

Primary Examiner—Gary V. Harkcom
Assistant Examiner—Raymond J. Bayerl
Attorney, Agent, or Firm—Kane, Dalsimer, Sullivan, Kurucz, Levy, Eisele and Richard

[57] ABSTRACT

In a printing device, all the print data is printed out without any print command when a predetermined time is counted after a reception buffer has run out of data. It is also possible to ensure an error-free, proper automatic print operation by providing a facility of discriminating between suspension of data transmission for the reason of processing and real stop of data transmission and another facility of selecting whether or not to carry out the automatic printing.

4 Claims, 4 Drawing Sheets

FIG. I

PRINTING DEVICE HAVING TIME COUNTING MEANS TO CONTROL PRINTING FROM PAGE BUFFER

BACKGROUND OF THE INVENTION

This invention relates to a printing device which carries out data processing and printing page by page of print data transmitted from an external computer or the like.

Conventionally, the printing device has been constituted to print out the print data stored therein so far as;

(1) a print position has reached a following page by virtue of a line feed command included in the data received, or of an automatic line feed function;

(2) a page break command has been received;

(3) a particular operation has been carried out with an external operation switch;

(4) an error such as "memory full" has occurred; and (5) a reset has been executed while data is stored in a page memory.

In such a printing device, however, it is likely to happen that, when a print unit is to print out the document data such as a program list, etc. received from an external computer or the like unit, as the program list, in general, does not include at its end any page break command, the data at the final page of the list has remained unprinted in a memory. In order to print out such data remaining in the memory, it has been a common practice to send a print command to the print unit through operation on a print control panel. Since most printing devices require several key operations to enter a print command, in order to avoid mis-operation, troublesome procedures have been necessary to effect an actual print-out.

SUMMARY OF THE INVENTION

It is therefore an object of this invention to provide an improved printing device capable of automatically printing out the print data remaining unprinted therein, provided some predetermined conditions are met.

For the above purpose, according to the invention, there is provided a printing device including print means, data receiving means for receiving a data to be printed, received data storing means for storing the data received by said receiving means, page data storing means for storing at least one page of character data and/or image data included in said data received, and control means for transferring the data in the received data storing means into said page data storing means page by page, while sending the data within said page data storing means to said print means, which further comprises:

data detecting means to detect if any data is present in said page data storing means and in said received data storing means; and time-counting means for delivering a signal when a predetermined time has elapsed since said detecting means has detected that no data was present in said received data storing means, said time-counting means being re-set to zero as soon as any data is discovered in said received data storing means;

wherein said control means sends the data stored within said page data storing means to said print means when data is present in said page data storing means while there is no data to be processed in said received data storing means and when the signal is delivered from said time-counting means.

Optionally, the printing device can be constituted such that it is detected by the data detecting means whether or not any image data is present in the page data storing means, and if any, the predetermined time given by the time-counting means can be prolonged.

Further, the printing device may be constituted so that it can selectively be set whether or not the data within the page data storing means should be sent to the print unit, even when the above conditions are satisfied.

According to the aforementioned arrangement of the printing device, even if a print data with no page break command at its end is received, the data is sent to the print unit for printing out, provided a condition lasts for a certain length of time in which no data exists in the received data storing means, while the data remain in the page data storing means. Consequently, all the print data can be printed out without sending a print command through operation on the control panel.

Furthermore, when there is a very large volume of image data to be processed, the predetermined period of time counted by the time-counting means can be prolonged. This helps to solve the problem that, since such a large data is often transmitted after being divided into small parts, transmission may be suspended at a short interval between such small data parts, while printing is continued as usual, resulting in an error in printing.

It is also possible to select on whether or not the data should be printed if the above conditions continue for a predetermined time. This allows the user to select whether or not to automatically print out the data when received from a computer or the like which is slow at data processing so that transmission sometimes stops for a long time.

DESCRIPTION OF THE ACCOMPANYING DRAWINGS

DESCRIPTION OF THE EMBODIMENTS

Figure 1:
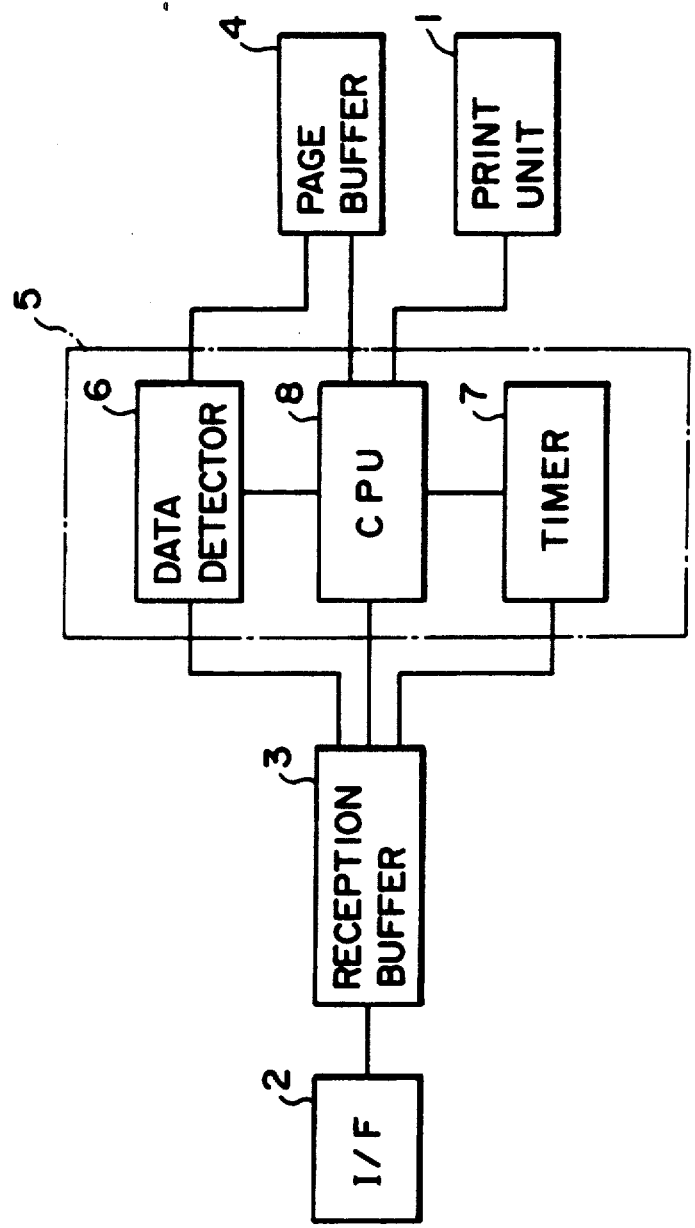
FIG. 1 is a functional block diagram of a printing device embodying the invention.

FIG. 1 shows a functional block diagram of the printing device embodying the invention, which comprises a print unit 1 for printing in accordance with print data, an interface 2 to receive the print data, a reception buffer 3 to store the print data received, a page buffer 4 to store character data and image data, per page, included in the print data received, and a control system 5 consisting of a data detector 6, a timer 7 and a CPU (central processing unit) 8.

The data detecter 6 checks to see if there is a data within the page buffer 4 and the reception buffer 3. The check result is transmitted to the CPU 8. The timer 7 starts time-counting when the data detecter 6 determined that there is no data in the reception buffer 3, and is re-set to zero when any data is detected in the reception butter 3. It generates and transmits a signal to the CPU 8 when a certain time elapses after start of the time-counting without being re-set. The CPU 8 processes the data within the reception buffer 3 and stores it per page in the page buffer 4. The data within the page buffer 4 is sent to the print unit 1 in accordance with the output signals from the data detecter 6 and the timer 7.

Figure 2:
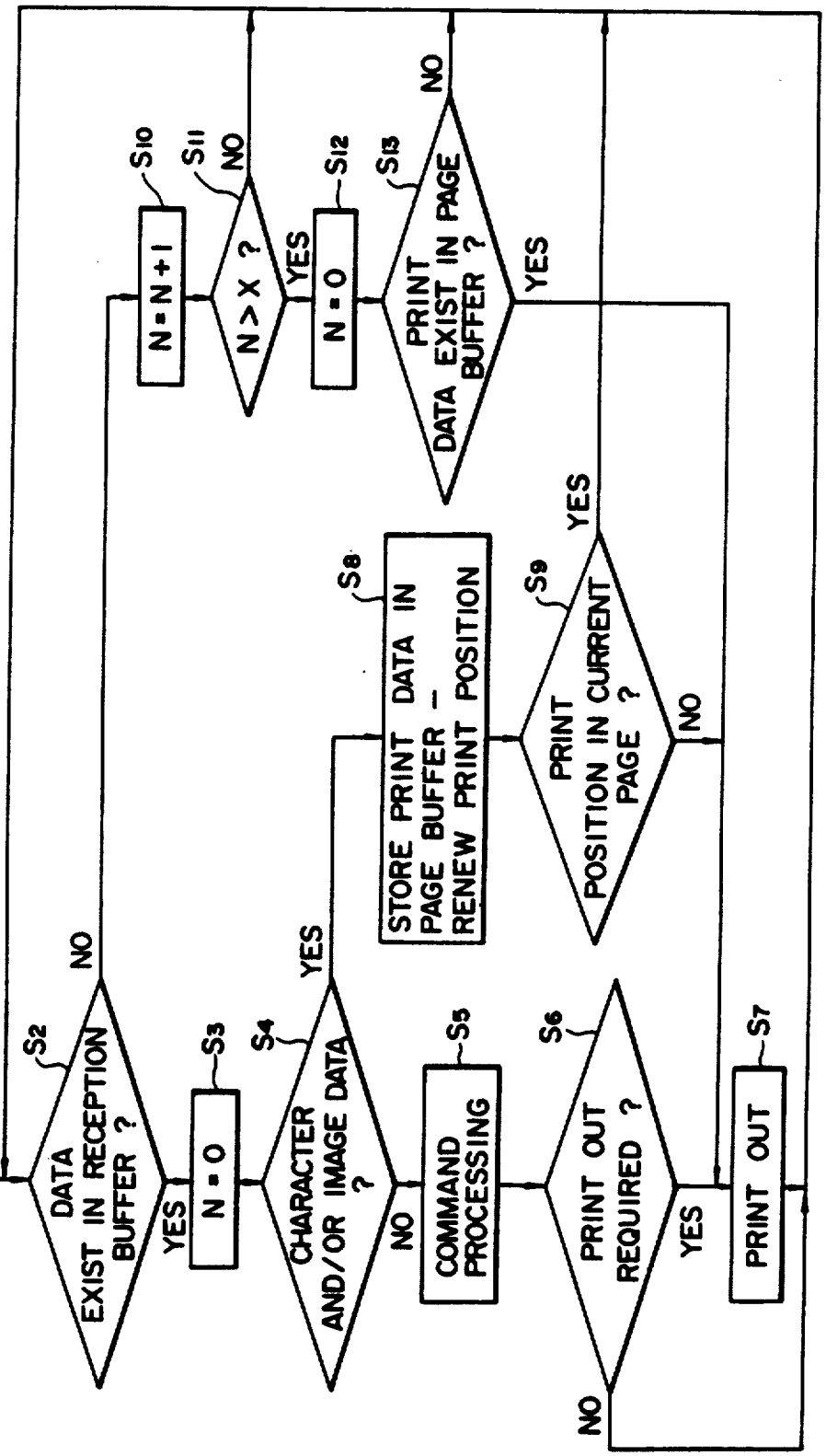
FIG. 2 is a flow chart of an operation program executed in the printing device shown in FIG. 1.

FIG. 2 is a flow chart of an operation program executed by the CPU 8 of the above printing device.

When processings start, the counter value "N" of the timer 7 is initialized to "0", and a constant value "X" to "10000" (step S1).

The data detecter 6 then examines if there is a data in the reception buffer 3 (step S2). If there is a data, "N" is cleared to "0" (step S3). It is then examined by the CPU 8 whether the data received in the reception buffer 3 is either a character data or an image data (both are simply referred to a print data in the description: step S4). If it is not a print data, the data received is a print control command, according to which an appropriate processing takes place (step S5).

It is then examined whether or not the print control command is a print output command (step S6). If so, the print data stored in the page buffer 4 is sent to the print unit 1 by way of the CPU 8 (step S7). If it is not a print output command, the processing returns to the step S2 to repeat the similar procedures.

If the step S4 determines that the data received is a print data, the data is stored in the page buffer 4, with a print position being updated (step S8). The print position is indicative of the print position next of the final data in the page buffer 4.

It is then examined whether or not the updated print position is within the current page (step S9). If it is in the current page, the processing returns to step S2 to repeat the similar processings. If it is not so, the processing goes to step S7 for carrying out printing. In more particular, printing takes place when step S9 determines that the print data stored in the page buffer 4 exceeds the storage capacity of the page buffer 4.

If, on the other hand, there is no data in the reception buffer 3 in step S2, "N" is incremented by "1" (step S10) and is then compared with "X" (step S11). If N>X, "N" is cleared to "0" (step S12), while N≦X, the processing returns to step S2 to repeat similar procedures. When the processing in step S12 is completed, it is examined by the data detecter 6 whether or not there is the print data present in the page buffer 4 (step S13). If so, the processing goes to step S7 for executing print-out, while if not, the processing returns to S2. Where there is no data within the reception buffer 3 in the foregoing processing, "N" counting starts. When "N" exceeds the value "10000" set at "X", in other words the certain period of time elapses without clearing "N", print-out processing is executed if there is any print data within the page buffer 4.

In the foregoing steps, the print data stored in the page buffer 4 is printed out in the following three cases, that the print command data is received, that the print data stored in the page buffer 4 exceeds the storage capacity of the page buffer 4, and that no data has been present in the reception buffer 3 for the certain period of time.

While in the foregoing description, the value "X" is set at "10000", it may be any suitable value other than "10000".

Figure 3:
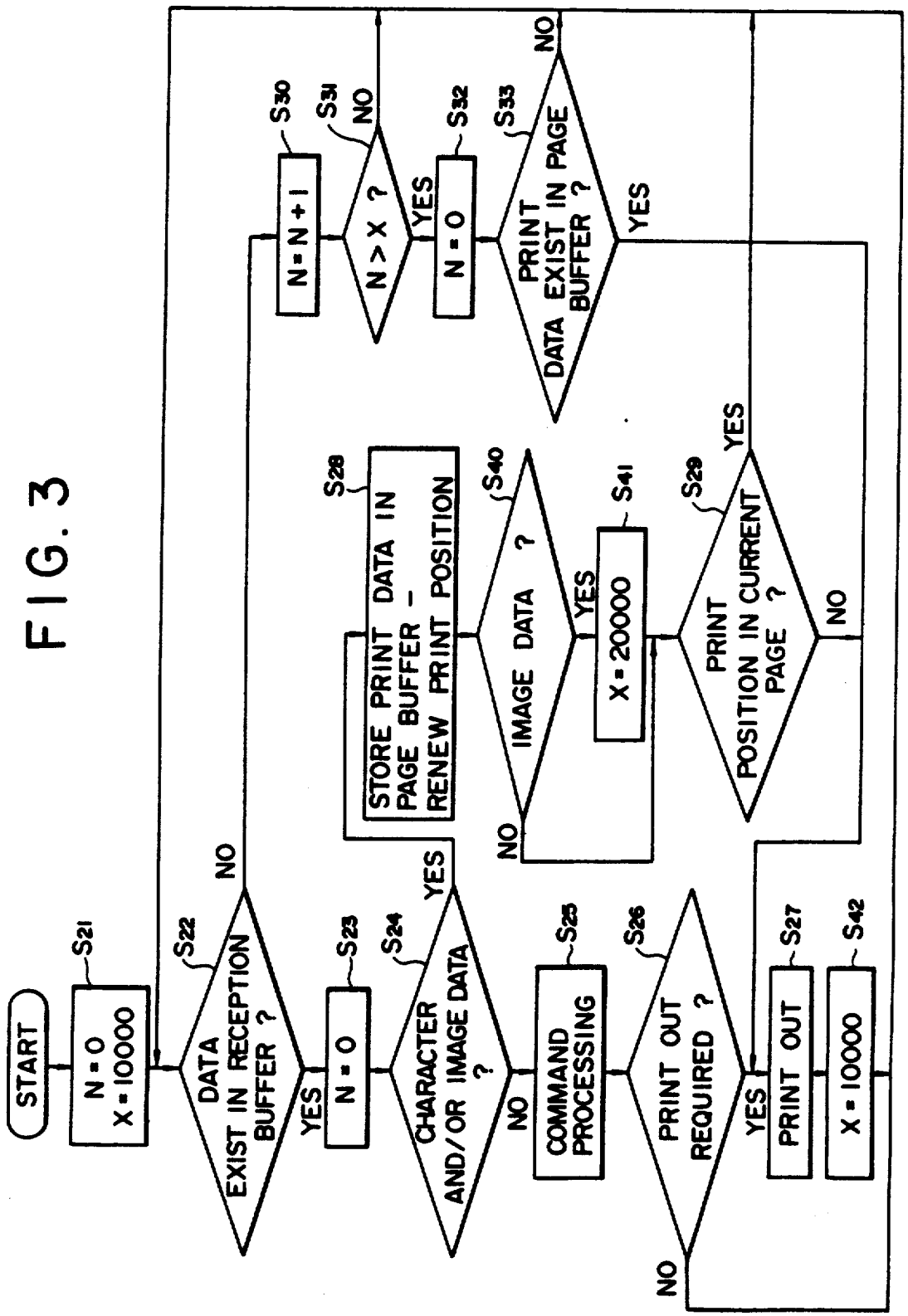
FIG. 3 is a flow chart of a modified operation program wherein a predetermined time counted is prolonged when an image data is being received.

FIG. 3 shows a flow chart of a modified operation program executed by the CPU 8, wherein the certain period of time to be counted is prolonged when there is any image data., in addition to the operation shown in the flow chart of FIG. 2.

The processings in steps S21 to S33 of FIG. 3 are generally similar to those in steps S1 to S13 in FIG. 2 except that steps S40 and S41 are added after the step S28 in FIG. 3 (step S8 in FIG. 2), and a step S42 after the step S27 (step S7 in FIG. 2).

In particular, after the processing in step S28, it is examined in the CPU 8 whether or not the print data stored in the page buffer 4 is image data (step 40). If so, the value "X" is set to "20000" (step S41) and step S29 follows. If it is not image data, i.e., it is character data, the processing in step S41 does not take place and directly goes to the step S29.

After print-out operation has been executed (step S27), the value "X" is restored to "10000" in step S42.

The processing mentioned above thus makes longer the certain period of time when the data within the page buffer 4 is image data than when it is character data.

While in the foregoing description, the value "X" in the steps S21 and S42 is set at "10000", it may be any other suitable value than "10000" as mentioned for the example in FIG. 2. Likewise, the value "X" set at "20000" in step S41 may be any other suitable value than "20000", provided it is larger than the "X" value in steps S21 and S42. Or, it may be a value to be separately set by an external unit.

Figure 4:
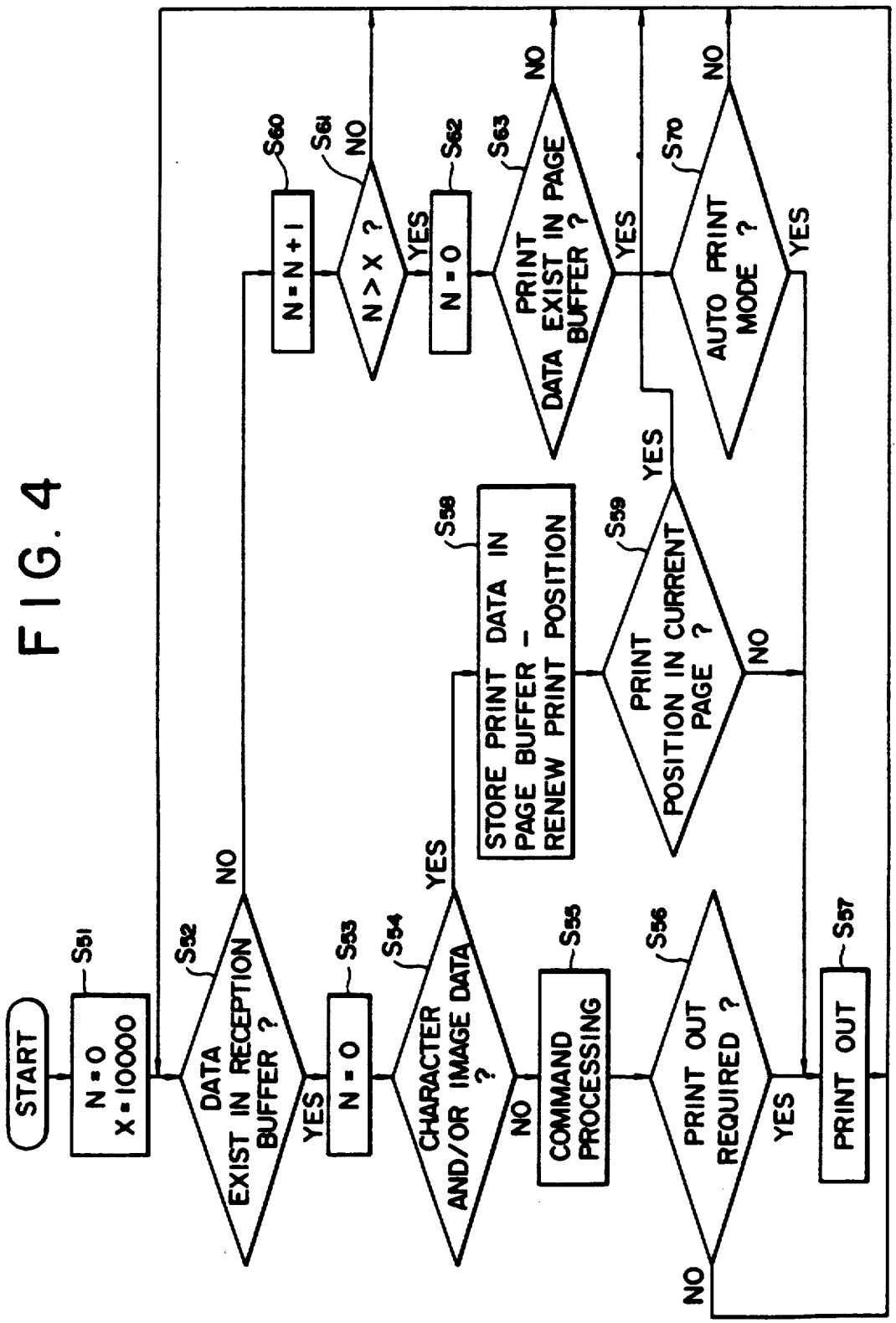
FIG. 4 is a flow chart of another modified operation program wherein it is selected whether or not automatic printing is effeted.

FIG. 4 is a flow chart showing still another operation program, wherein selecting step whether or not to effect automatic printing is provided in addition to the operation of FIG. 2.

In this flow chart, processings in steps S51 to S63 are again generally similar to those in steps S1 through S13 in FIG. 2. The difference from FIG. 2 lies in that the processing S13 in FIG. 2 (S63 in FIG. 4) is followed by an additional processing to examine whether or not the current mode is to carry out an automatic print-out (step S70). If it is an automatic print mode, the processing goes to S57, while returning to step S52 if not.

According to this embodiment, therefore, if a user has already selected an automatic print mode before carrying out this processing, the processing in FIG. 2 is automatically executed, while if not, printing takes place only when the print-out command is received or when the print data stored in the page buffer 4 exceed the storage capacity of page buffer 4.

The above described printing device thus makes it possible to carry out printing even if the reception buffer 3 has run out of data for a certain length of time. This enables the printing device to print out, if there is no page break command included at the end of a data received, all the print data after the certain period of time counted, without the print command. This allows the user to eliminate any command operation for printing out a print data remaining unprinted.

When an external computer sends an extremely large volume of image data, it sometimes happens if such a computer has a limited storage capacity that divided parts of an image data are transmitted in sequence while executing necessary processing. In this case, data transmission tends to be suspended for a short time. Since the certain period of time counted can be prolonged when an image data has been detected, an automatic printing in error due to short-time suspension of data transmission can be prevented. That is, it can be possible to discriminate between suspension of data transmission for a processing reason and a real stop of data transmission.

Furthermore, it is possible to select whether or not to effect automatic printing. If a data is received from a computer or the like that takes a longer time for processing causing data transmission to be suspended for long, the user is able to avoid setting the automatic print mode so as to prevent an error in automatic printing due to long-time suspension of data transmission, ensuring a correct print-out operation.

What is claimed is:

1. In a printing device including:

print means, data receiving means for receiving data to be printed, received data storing means for storing the data received by said receiving means, page data storing means for storing at least one page of character data and/or image data included in said data received, and control means for transferring the data in the received data storing means into said page data storing means and for sending the data within said page data storing means to said print means, the improvement which further comprises:

data detecting means to detect the presence of data in said page data storing means and in said received data storing means; and time-counting means for delivering a signal when a predetermined time has elapsed since said detecting means has detected that no data was present in said received data storing means, said time-counting means being re-set to zero as soon as any data is discovered in said received data storing means;

wherein said control means without a command initiated by a user automatically sends the data stored within said page data storing means to said print means for printing, in response to said signal.

2. The printing device according to claim 1, wherein said data detecting means detects whether or not any image data is present in said page data storing means, and if any, said predetermined time is prolonged.

3. The printing device according to claim 2, which further comprises select means for selectively setting whether or not to send the data within said page data storing means to said print means when data exists in said page data storing means while there is no data to be processed in said received data storing means and when the signal is delivered from said time-counting means.

4. The printing device according to claim 1, which further comprises select means for selectively setting whether or not to send the data within said page data storing means to said print means when data exists in said page data storing means while there is no data to be processed in said received data storing means and when the signal is delivered from said time-counting means.

* * * * *